US012733716B2

(12) United States Patent
Chen

(10) Patent No.: US 12,733,716 B2
(45) Date of Patent: Sep. 15, 2026

(54) FASTENING DEVICE AND LACE TIGHTENING AND RELEASING METHOD

(71) Applicant: Yi-ying Chen, Taichung City (TW)

(72) Inventor: Yi-ying Chen, Taichung City (TW)

( * ) Notice: Subject to any disclaimer, the term of this patent is extended or adjusted under 35 U.S.C. 154(b) by 0 days.

(21) Appl. No.: 18/263,889

(22) PCT Filed: Feb. 9, 2022

(86) PCT No.: PCT/CN2022/075654

§ 371 (c)(1),
(2) Date: Aug. 1, 2023

(87) PCT Pub. No.: WO2022/171125

PCT Pub. Date: Aug. 18, 2022

(65) Prior Publication Data

US 2024/0049840 A1 Feb. 15, 2024

(30) Foreign Application Priority Data

Feb. 9, 2021 (CN) ........................ 202110180676.3

(51) Int. Cl.
*A43C 11/16* (2006.01)
*F16G 11/12* (2006.01)

(52) U.S. Cl.
CPC ............ *A43C 11/165* (2013.01); *F16G 11/12* (2013.01)

(58) Field of Classification Search
CPC ....... A43C 11/165; A43C 11/16; F16G 11/12; B65H 75/4471; B65H 75/4492; B65H 75/4431; B65H 75/4428; B65H 75/14; B65H 2403/47; B65B 13/188; B65B 13/18
See application file for complete search history.

(56) References Cited

U.S. PATENT DOCUMENTS 4,619,057 A * 10/1986 Sartor .................. A43B 5/0452 36/117.7
4,660,300 A * 4/1987 Morell ................... A43C 11/16 242/388.3
5,157,813 A 10/1992 Carroll
(Continued)

FOREIGN PATENT DOCUMENTS

CN 2396370 Y 9/2000
CN 201718602 U 1/2011
(Continued)

*Primary Examiner* — Jason W San
*Assistant Examiner* — Louis A Mercado
(74) *Attorney, Agent, or Firm* — CKC & Partners Co., LLC

(57) ABSTRACT

A fastening device includes a case, a spool, a plurality of ratchet teeth, an incremental releasing set and a knob. The incremental releasing set includes a ratchet element and a swinging arm, the ratchet element includes a ratchet arm and a linking portion, the ratchet arm is selectively engaged with at least one of the ratchet teeth, and the swinging arm is abutted against the linking portion. The ratchet arm is engaged with at least one of the ratchet teeth to prohibit the spool from rotating in a releasing direction; as the knob is rotated in a tightening direction, the ratchet arm is disengaged from at least one of the ratchet teeth to allow the spool to tighten the lace; as the swinging arm is operated, the lace is incrementally released; as the knob is pulled up or rotated in the releasing direction, the lace is fully released.

10 Claims, 6 Drawing Sheets

(56) References Cited

U.S. PATENT DOCUMENTS

| | | | | |
|---|---|---|---|---|
| 7,367,522 | B2 * | 5/2008 | Chen | A43C 7/00 242/378.1 |
| 8,231,074 | B2 * | 7/2012 | Hu | A43C 11/20 242/388.2 |
| 8,245,371 | B2 * | 8/2012 | Chen | A43C 11/16 24/713.2 |
| 8,308,098 | B2 * | 11/2012 | Chen | A43C 11/008 242/378.1 |
| 9,808,049 | B2 * | 11/2017 | Piva | A43C 7/00 |
| 11,064,767 | B2 | 7/2021 | Chen | |
| 11,492,228 | B2 * | 11/2022 | Kruse | B65H 75/30 |
| 11,825,911 | B2 * | 11/2023 | Chen | A43C 11/165 |
| 2003/0093882 | A1 * | 5/2003 | Gorza | A43C 11/165 24/68 SK |
| 2011/0191992 | A1 | 8/2011 | Chen | |
| 2011/0303782 | A1 | 12/2011 | Hu et al. | |
| 2015/0076272 | A1 | 3/2015 | Trudel et al. | |
| 2016/0066653 | A1 | 3/2016 | Piva et al. | |
| 2019/0216176 | A1 | 7/2019 | Converse et al. | |
| 2024/0000194 | A1 * | 1/2024 | Chen | B65H 75/4492 |
| 2024/0035546 | A1 * | 2/2024 | Tasi | F16G 11/12 |

FOREIGN PATENT DOCUMENTS

| | | | |
|---|---|---|---|
| CN | 105159393 | A | 12/2015 |
| CN | 105680260 | A | 6/2016 |
| CN | 106915488 | A | 7/2017 |
| CN | 106919220 | A | 7/2017 |
| CN | 111115388 | A | 5/2020 |
| CN | 111115389 | A | 5/2020 |
| CN | 210747574 | U | 6/2020 |
| CN | 211196727 | U | 8/2020 |
| CN | 111846339 | A | 10/2020 |
| CN | 112089154 | A | 12/2020 |
| DE | 202016104318 | U1 | 11/2016 |
| IT | 202000029228 | A1 | 6/2022 |
| JP | H05211906 | A | 8/1993 |
| JP | 2015067372 | A | 4/2015 |
| JP | 2015150426 | A | 8/2015 |
| JP | 2016519604 | A | 7/2016 |
| JP | 2018121890 | A | 8/2018 |
| JP | 2018524242 | A | 8/2018 |
| TW | 202012298 | A | 4/2020 |
| TW | 202206365 | A | 2/2022 |
| WO | 2020/223631 | A1 | 11/2020 |

* cited by examiner

FASTENING DEVICE AND LACE TIGHTENING AND RELEASING METHOD

RELATED APPLICATIONS

This application is a continuation of International application No. PCT/CN2022/075654, filed Feb. 9, 2022, which claims the benefits of priority of CN application No. 202110180676.3 filed on Feb. 9, 2021, the content of which are incorporated herein by reference.

BACKGROUND

Technical Field

The present disclosure relates to a fastening device and a tightening and releasing method. More particularly, the present disclosure relates to a fastening device for releasing or tightening a lace and a lace tightening and releasing method.

Description of Related Art

In daily life, cords, such as a lace or a thread, are usually used to tighten articles. The most common tightening method is to use the cord to reciprocately pass through holes on the article, such as eyelets of a shoe, and then tie a knot to secure the article. But in this kind of tightening method, the knot is loosened easily because of an external force. Not only does the knot need to be tied again, but also lots of inconveniences come owing to the insecurity of the articles.

In order to solve such problems, some practitioners developed a simple fastening mechanism including a case, a driving unit and a spring. The case includes holes configured for the lace to pass therethrough. Through the reaction force between the spring and the driving unit, the lace can be clamped between the driving unit and the case so as to be fastened. The length of the lace can be changed by pressing the spring to change the position of the driving unit. However, in such fastening mechanism, the restoring force of the spring is served as the securing force; thus, the lace is easily to be released owing to vibrations or an external force. In addition, the fastening mechanism has no space to receive the lace, and the exposure of the lace may bring danger.

Therefore, some practitioners developed another kind of buckle which may be rotated to tighten the cord, the cord may be received inside the buckle, and through the interference between components inside the buckle, and the length of the cord as well as the tightness may be adjusted. However, the structure of the buckle is complex, such that the manufacturing cost is increased, and the buckle has assembly and repair difficulties. In addition, as releasing the buckle, only full release function can be practiced, but the cord (lace) cannot be sectionally (incrementally) released, and there is still an inconvenience of usage.

Based on the aforementioned problems, how to improve the structure of the fastening device such as the buckle to include an incremental release function becomes a target that those in the industry pursue.

SUMMARY

According to one embodiment of the present disclosure a fastening device is provided, which includes a case, a spool, a plurality of ratchet teeth, an incremental releasing set and a knob. The case includes an inner space, the spool is disposed in the inner space and configured for a lace to be wound therearound, and the ratchet teeth are located in the inner space. The incremental releasing set includes a ratchet element and a swinging arm, the ratchet element includes a ratchet arm and a linking portion, the ratchet arm is selectively engaged with at least one of the ratchet teeth, and the swinging arm is abutted against the linking portion. The knob is disposed at the case. The ratchet arm is engaged with at least one of the ratchet teeth to prohibit the spool from rotating in a releasing direction, and as the knob is rotated in a tightening direction, the ratchet arm is disengaged from at least one of the ratchet teeth to allow the spool to tighten the lace; as the swinging arm is operated, the ratchet arm is disengaged from at least one of the ratchet teeth, such that allows the lace to be incrementally released; as the knob is pulled up or rotated in the releasing direction, the ratchet arm does not prohibit the spool from rotating in the releasing direction, thereby allowing the lace to be fully released.

According to another embodiment of the present disclosure a lace tightening and releasing method is provided, which includes a fastening step, an incremental releasing step and a full releasing step. In the fastening step, a fastening device disposed at an article is operated, the fastening device includes a case, a spool, a plurality of ratchet teeth, a ratchet element and a knob, the spool is coupled to a lace and located within the case, wherein as the knob is rotated in a tightening direction, a ratchet arm of the ratchet element is disengaged from at least one of the ratchet teeth to allow the spool to fasten the lace. In the incremental releasing step, a swinging arm of the fastening device is operated, the swinging arm moves a linking portion of the ratchet element, and the ratchet arm is disengaged from at least one of the ratchet teeth to engage with at least another one of the ratchet teeth, thereby allowing the spool to rotate in a releasing direction to release one segment of the lace. In the full releasing step, the knob is operated to allow the ratchet arm of the fastening device not to prohibit the spool from rotating in the releasing direction, thereby allowing the lace to be freely released.

DETAILED DESCRIPTION

Figure 1:
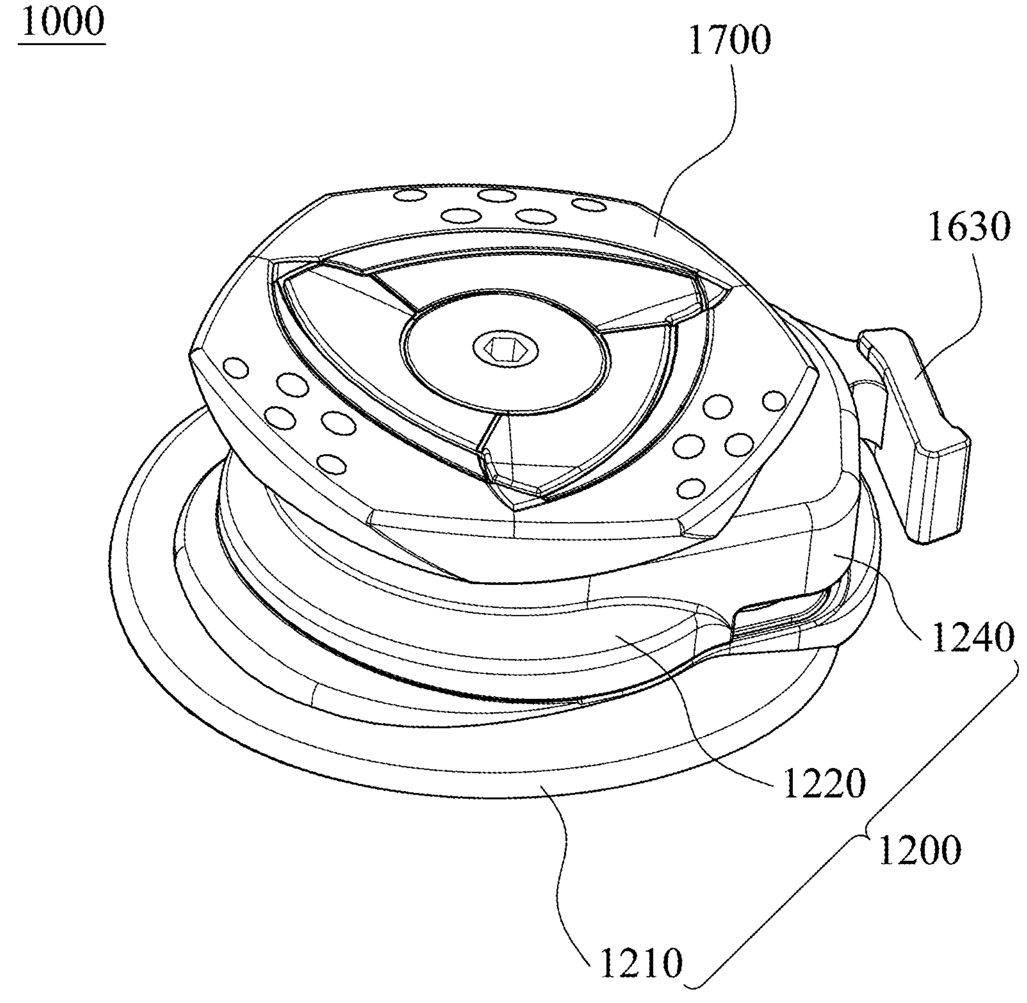
FIG. 1 shows a three-dimensional schematic view of a fastening device according to a first embodiment of the present disclosure.

The embodiments of the present disclosure will be illustrated with drawings hereinafter. In order to clearly describe the content, many practical details will be mentioned with the description hereinafter. However, it will be understood by the reader that the practical details will not limit the present disclosure. In other words, in some embodiment of the present disclosure, the practical details are not necessary. Additionally, in order to simplify the drawings, some conventional structures and elements will be illustrated in the drawings in a simple way; the repeated elements may be labeled by the same or similar reference numerals.

In addition, the terms first, second, third, etc. are used herein to describe various elements or components, these elements or components should not be limited by these terms. Consequently, a first element or component discussed below could be termed a second element or component. Moreover, the combinations of the elements, the components, the mechanisms and the modules are not well-known, ordinary or conventional combinations, and whether the combinations can be easily completed by the one skilled in the art cannot be judged based on whether the elements, the components, the mechanisms or the module themselves are well-known, ordinary or conventional.

Figure 2:
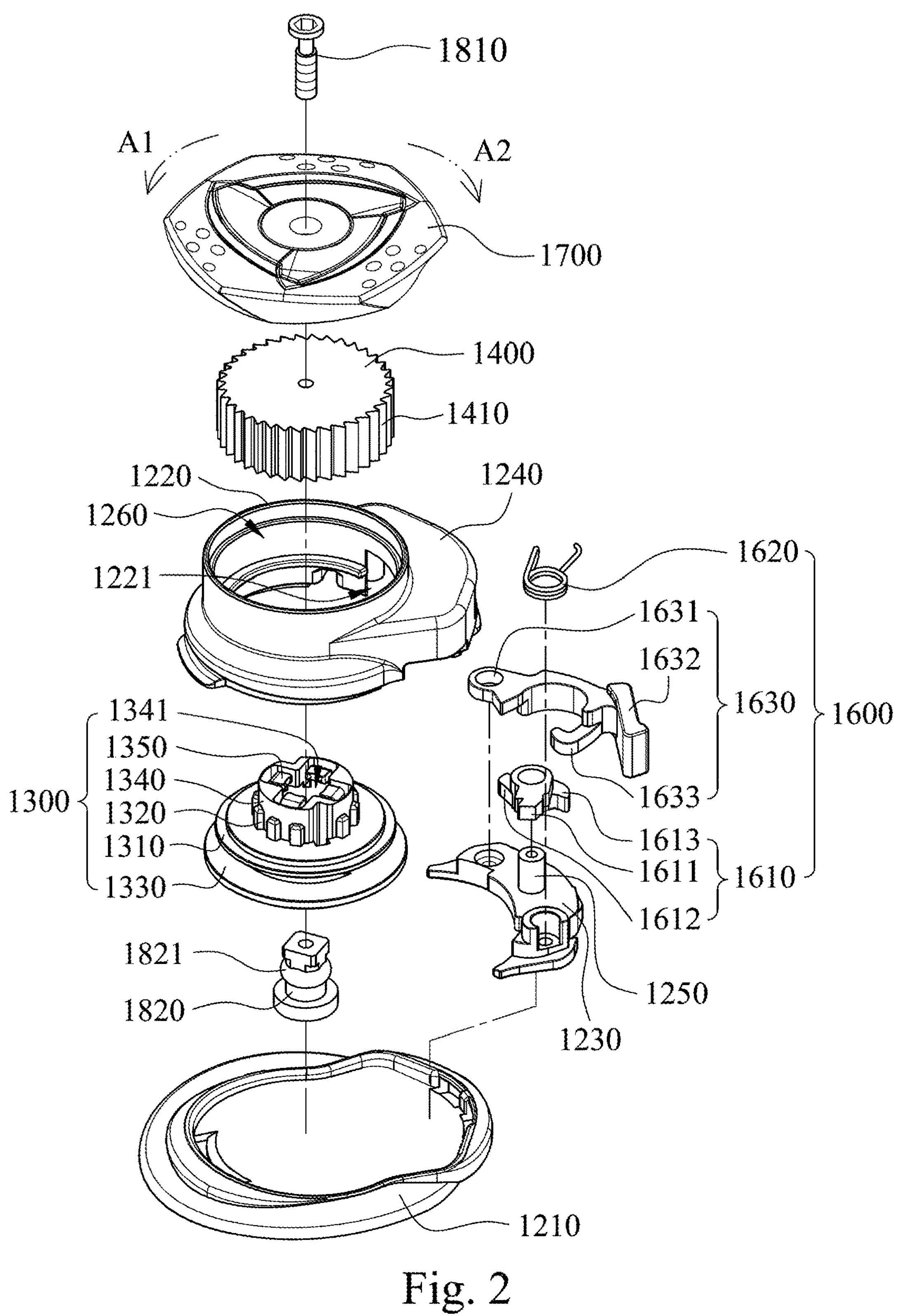
FIG. 2 shows one exploded view of the fastening device of the first embodiment of FIG. 1.
Figure 3:
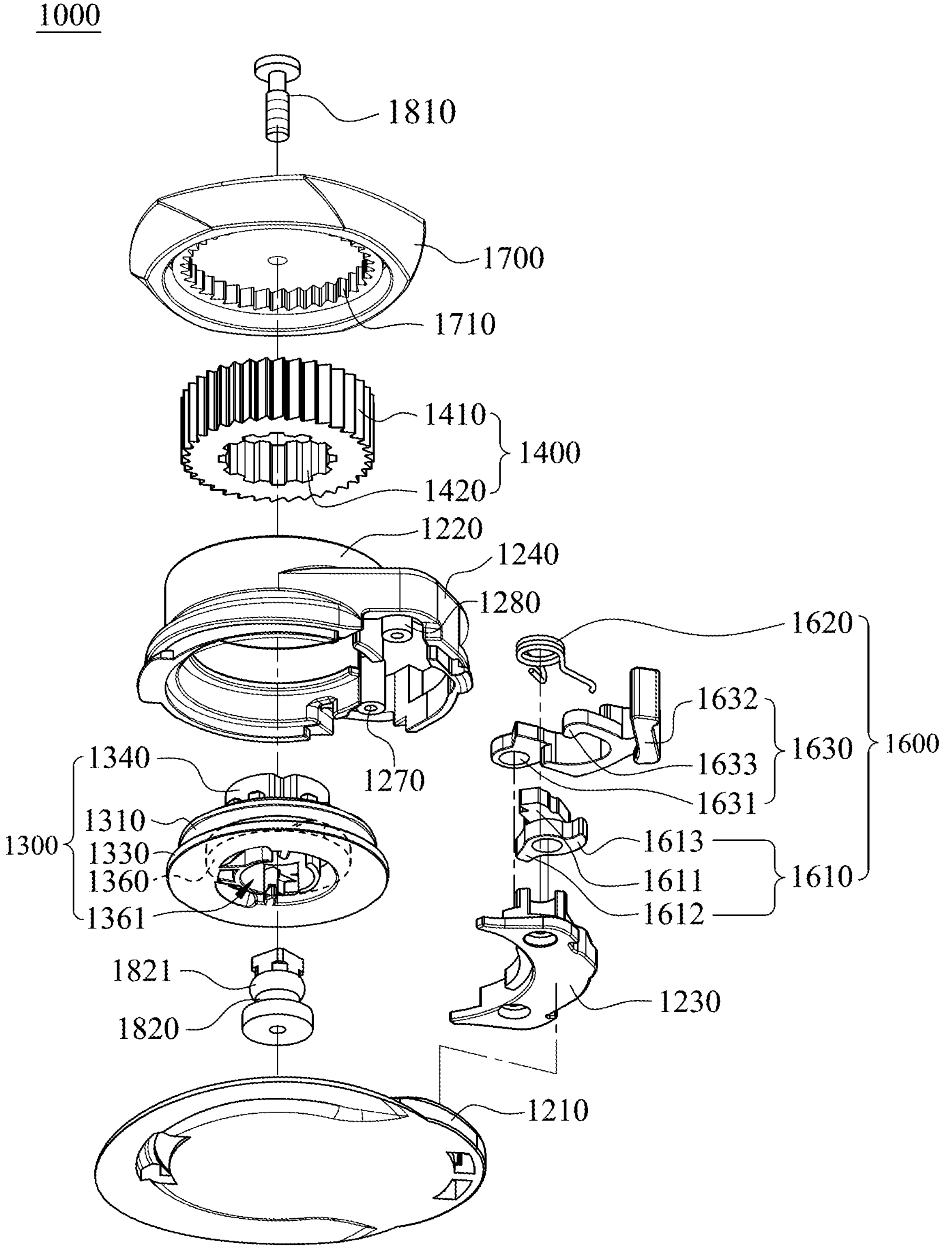
FIG. 3 shows another exploded view of the fastening device of the first embodiment of FIG. 1.

Please refer to FIGS. 1, 2 and 3, FIG. 1 shows a three-dimensional schematic view of a fastening device 1000 according to a first embodiment of the present disclosure, FIG. 2 shows one exploded view of the fastening device 1000 of the first embodiment of FIG. 1, and FIG. 3 shows another exploded view of the fastening device 1000 of the first embodiment of FIG. 1. The fastening device 1000 includes a case 1200, a spool 1300, a plurality of ratchet teeth 1410, an incremental releasing set 1600 and a knob 1700. The case 1200 includes an inner space 1260, the spool 1300 is disposed in the inner space 1260 and configured for a lace (not shown) to be wound therearound, and the ratchet teeth 1410 are located in the inner space 1260. The incremental releasing set 1600 includes a ratchet element 1610 and a swinging arm 1630, the ratchet element 1610 includes a ratchet arm 1611 and a linking portion 1613, the ratchet arm 1611 is selectively engaged with at least one of the ratchet teeth 1410, and the swinging arm 1630 is abutted against the linking portion 1613. The knob 1700 is disposed at the case 1200. The ratchet arm 1611 is engaged with at least one of the ratchet teeth 1410 to prohibit the spool 1300 from rotating in a releasing direction A1, and as the knob 1700 is rotated in a tightening direction A2, the ratchet arm 1611 is disengaged from at least one of the ratchet teeth 1410 to allow the spool 1300 to tighten the lace; as the swinging arm 1630 is operated, the ratchet arm 1611 is disengaged from at least one of the ratchet teeth 1410, such that allows the lace to be incrementally released; as the knob 1700 is pulled up or rotated in the releasing direction A1, the ratchet arm 1611 does not prohibit the spool 1300 from rotating in the releasing direction A1.

Therefore, before operating the swinging arm 1630, the ratchet arm 1611 may prohibit the spool 1300 from releasing the lace, after operating the swinging arm 1630, the lace may be incrementally released, and operating the knob 1700 may full release the lace, thereby achieving goals of incrementally releasing and fully releasing the lace. Details of the fastening device 1000 may be described hereinafter.

The fastening device 1000 may further include a ratchet gear 1400, which is disposed in the inner space 1260 and selectively coupled to the spool 1300, and the ratchet teeth 1410 are located at an outer surface of the ratchet gear 1400, thereby being located in the inner space 1260. Precisely, the ratchet gear 1400 is cylinder-shaped and includes an inner surface and the outer surface, and the ratchet gear 1400 may further include a plurality of first combining teeth 1420 located at the inner surface. The knob 1700 may include a plurality of knob teeth 1710, the knob teeth 1710 may be engaged with the ratchet teeth 1410, and thereby rotating of the knob 1700 may drive the ratchet gear 1400 to rotate.

Figure 4:
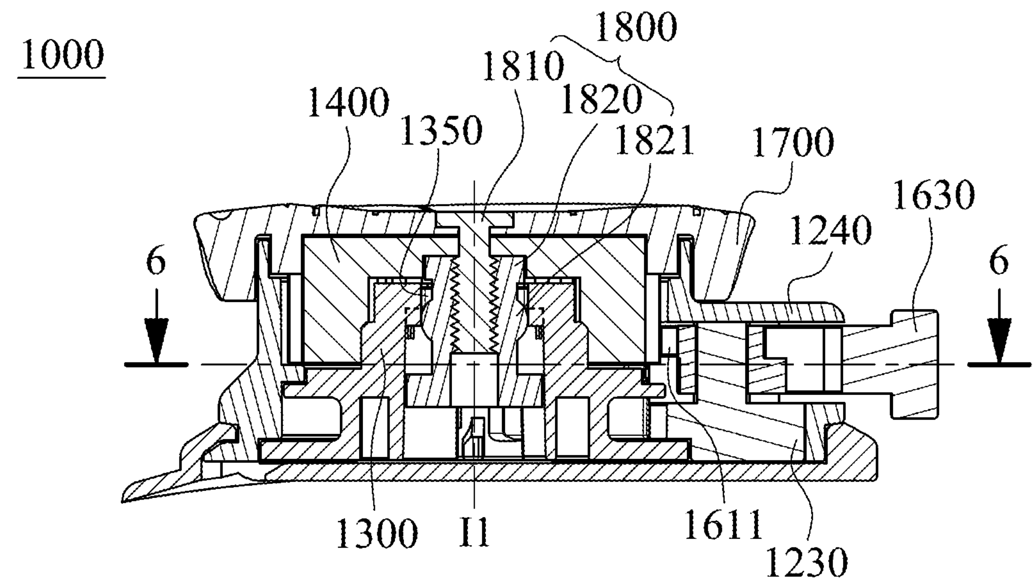
FIG. 4 shows one cross-sectional view of the fastening device of the first embodiment of FIG. 1.
Figure 5:
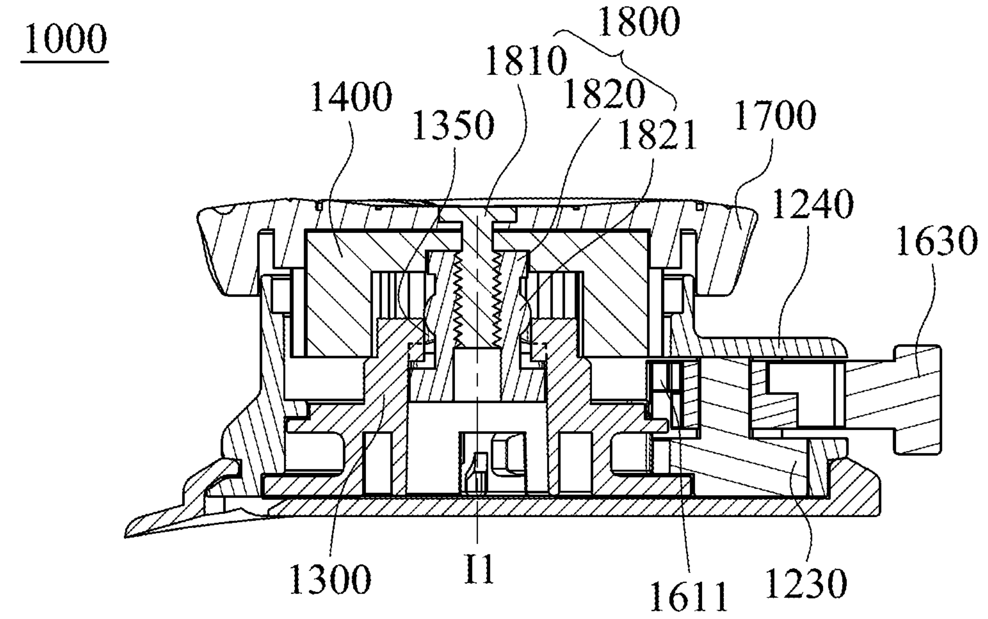
FIG. 5 shows another cross-sectional view of the fastening device of the first embodiment of FIG. 1.

Please refer to FIGS. 4 and 5, with reference of FIGS. 1 to 3, FIG. 4 shows one cross-sectional view of the fastening device 1000 of the first embodiment of FIG. 1, and FIG. 5 shows another cross-sectional view of the fastening device 1000 of the first embodiment of FIG. 1. The ratchet gear 1400 may be selectively coupled to the spool 1300, and the knob 1700 is operated to allow the ratchet gear 1400 to be lifted to release a coupling between the ratchet gear 1400 and the spool 1300. To be more specific, the fastening device 1000 may further include a positioning shaft 1820, which is connected to the ratchet gear 1400 and protrudes toward the spool 1300, the spool 1300 includes a positioning portion 1350, the positioning shaft 1820 is insertably disposed in the positioning portion 1350, the knob 1700 is pulled upward to move the ratchet gear 1400 and the positioning shaft 1820 along an axial direction 11, thereby releasing the coupling between the ratchet gear 1400 and the spool 1300, and the positioning shaft 1820 is restricted by the positioning portion 1350.

Specifically, the fastening device 1000 may include a connecting unit 1800, the connecting unit 1800 includes the positioning shaft 1820 and a screw bar 1810, the screw bar 1810 is fastened downward into the positioning shaft 1820 from an upper side of the knob 1700, such that the positioning shaft 1820 is connected to the knob 1700 and the ratchet gear 1400.

The spool 1300 may include an upper ring portion 1310, a lower ring portion 1330, a winding shaft 1360, an upper protruding portion 1340 and a plurality of second combining teeth 1320, the winding shaft 1360 is connected between the upper ring portion 1310 and the lower ring portion 1330, such that a winding track is formed for receiving the lace, the winding shaft 1360 includes a central hole 1361, the upper protruding portion 1340 protrudes from the upper ring portion 1310 toward the knob 1700 and includes an aperture 1341 communicated with the central hole 1361, and the second combining teeth 1320 are located at the outer surface of the upper protruding portion 1340 and configured to couple to the first combining teeth 1420. The positioning portion 1350 is located in the aperture 1341, and the positioning shaft 1820 passes through the aperture 1341 into the central hole 1361.

The aperture 1341 is cross-shaped and includes four end openings, the positioning portion 1350 includes four protruding arms, each protruding arm is located in each end opening, and a free end of each protruding arm is arc-shaped to form a circular hole portion. The positioning shaft 1820 includes a positioning projection 1821, and as the knob 1700 is in a first position, the positioning projection 1821 is positioned below the positioning portion 1350; as the knob 1700 moves along the axial direction 11 to a second position, the positioning projection 1821 pushes the positioning portion 1350 to allow the four protruding arms to be deformed so as to pass through the circular hole portion, and the positioning projection 1821 is located above the positioning portion 1350 and restricted thereby.

Hence, as shown in FIG. 4, as the knob 1700 is in the first position, the first combining teeth 1420 are combined with the second combining teeth 1320, rotating the knob 1700 in the tightening direction A2, the ratchet arm 1611 is pushed to swing outward to separate from the ratchet teeth 1410, and the spool 1300 is allowed to rotate in the tightening direction A2, thereby fastening the lace. If the user stops rotating the knob 1700, the ratchet arm 1611 will engage with the ratchet teeth 1410, prohibiting the spool 1300 from rotating in the releasing direction A1, thereby securing the lace. As fully releasing the lace, the user may pull the knob 1700 upward along the axial direction 11 to allow it to be located in the second position, at this time the ratchet gear 1400 is lifted, the first combining teeth 1420 are disengaged from the second combining teeth 1320, and the spool 1300 is not affected and may be freely rotated in the releasing direction A1. It is noted that, as fully releasing the lace, the ratchet arm 1611 may be still engaged with the ratchet teeth 1410, but the first combining teeth 1420 are disengaged from the second combining teeth 1320, or the ratchet arm 1611 may be disengaged from the ratchet teeth 1410, but the first combining teeth 1420 are still engaged with the second combining teeth 1320, and the present disclosure is not limited thereto.

A trigger portion 1632 of the swinging arm 1630 may expose from the case 1200, which is for the user to easily operate. Specifically, the case 1200 may include an annular wall 1220, a covering portion 1240 and a pivoting base 1230. The annular wall 1220 may include an opening 1221, the covering portion 1240 radially extends from the annular wall 1220 outward, and the pivoting base 1230 is connected to the covering portion 1240 to form a pivoting space. The annular wall 1220 may surround the inner space 1260, the covering portion 1240 is integrally connected to an outer surface of the annular wall 1220, and the opening 1221 penetrates a main body of the annular wall 1220 to allow the inner space 1260 to be communicated with the pivoting space. The ratchet element 1610 and the swinging arm 1630 are pivoted in different positions of the pivoting base 1230 and are partially located in the pivoting space, the ratchet element 1610 extends into the inner space 1260 from the opening 1221 to allow the ratchet arm 1611 to engage with at least one of the ratchet teeth 1410, and at least one portion of the swinging arm 1630 exposes from the pivoting space, that is the covering portion 1240 covering the pivoting base 1230 and hiding the ratchet element 1610 but not totally hiding the swinging arm 1630, such that the trigger portion 1632 of the swinging arm 1630 may expose from the case 1200. The case 1200 may further include three pivoting levers 1250, 1270, 1280 and a bracket 1210, the pivoting lever 1250 extends upward from the pivoting base 1230 and is configured for the ratchet arm 1611 to be pivotally disposed thereon, the pivoting levers 1270, 1280 extend downward from the covering portion 1240, the pivoting lever 1270 is configured for the swinging arm 1630 to be pivotally disposed thereon, and the bracket 1210 is configured for the annular wall 1220 and the pivoting base 1230 to be disposed thereon.

To be more specific, the ratchet element 1610 may further include a stopping portion 1612, the stopping portion 1612 is arranged with the ratchet arm 1611 in an interval, and as the ratchet arm 1611 is engaged with at least one of the ratchet teeth 1410, the stopping portion 1612 is not engaged with any one of the ratchet teeth 1410; as the swinging arm 1630 is operated to allow the ratchet arm 1611 to disengage from at least one of the ratchet teeth 1410, the stopping portion 1612 is engaged with at least another one of the ratchet teeth 1410, thereby stopping the spool 1300. Precisely, a toothed structure of one end of the ratchet element 1610 may be defined as the ratchet arm 1611, a lever structure of the other end of the ratchet element 1610 may be defined as the stopping portion 1612, the stopping portion 1612 is so configured that it and the ratchet arm 1611 do not engage with the ratchet teeth 1410 at the same time, another hook structure of the ratchet element 1610 may be defined as the linking portion 1613, and the linking portion 1613 is further away from the ratchet teeth 1410 than the ratchet arm 1611 and the stopping portion 1612. The ratchet element 1610 may include a pivoting hole configured to allow the pivoting lever 1250 to pass therethrough, such that the ratchet element 1610 may be pivotally positioned on the pivoting base 1230, and the ratchet element 1610 may extend into the inner space 1260 from the opening 1221, thereby allowing the ratchet arm 1611 to correspond to the ratchet teeth 1410.

The swinging arm 1630 may include a pivoting portion 1631, the trigger portion 1632 and a hook portion 1633, the pivoting portion 1631 is pivoted at the pivoting lever 1270, the trigger portion 1632 extends from the pivoting portion 1631, and the hook portion 1633 extends from the trigger portion 1632 toward the linking portion 1613 so as to hook the linking portion 1613.

Figure 6A:
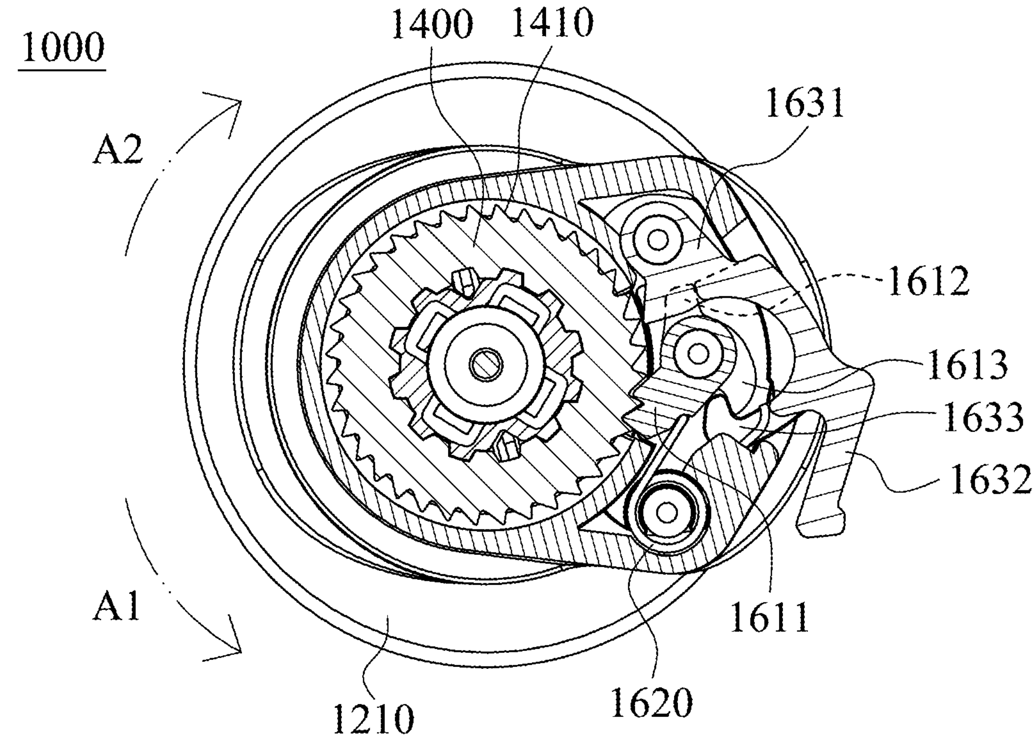
FIG. 6A shows one cross-sectional view of the fastening device of the first embodiment of FIG. 4 taken along line 6-6.
Figure 6B:
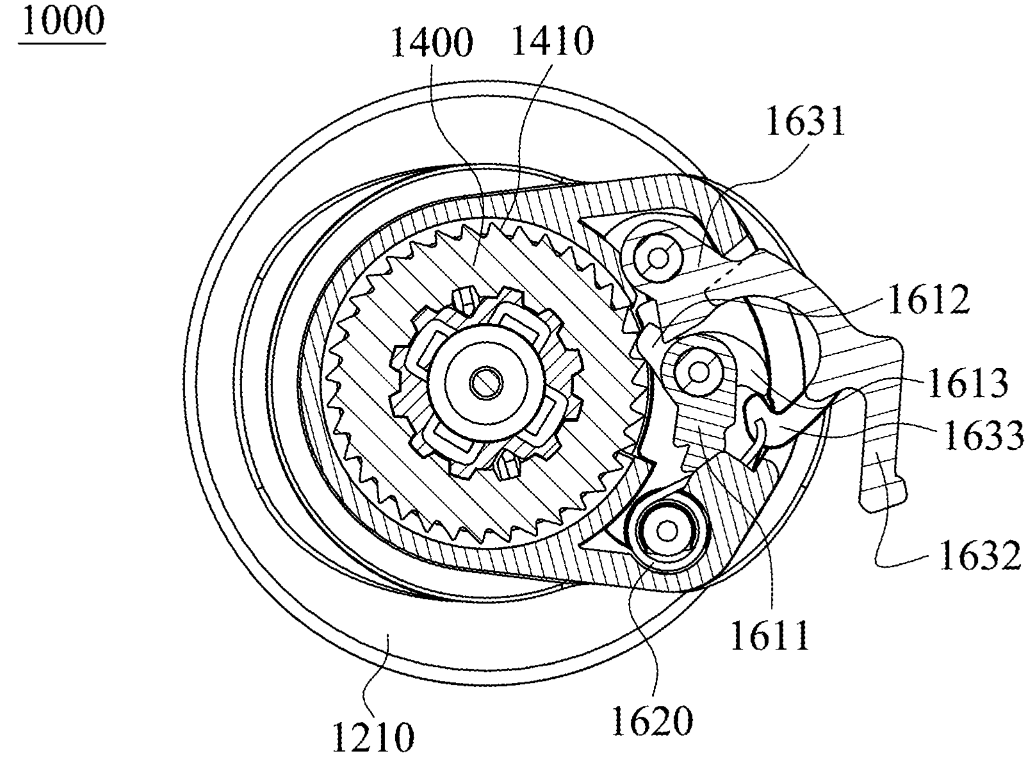
FIG. 6B shows another cross-sectional view of the fastening device of the first embodiment of FIG. 4 taken along line 6-6.

Please refer to FIGS. 6A and 6B, with references of FIGS. 2 to 5, FIG. 6A shows one cross-sectional view of the fastening device 1000 of the first embodiment of FIG. 4 taken along line 6-6, and FIG. 6B shows another cross-sectional view of the fastening device 1000 of the first embodiment of FIG. 4 taken along line 6-6. As shown in FIG. 6A, as the ratchet arm 1611 is engaged with the ratchet teeth 1410, rotation of the spool 1300 in the releasing direction A1 may be prohibited as the aforementioned; on the contrary, as the user operates the swinging arm 1630, the swinging arm 1630 may be swung around the pivoting portion 1631, the hook portion 1633 pushes the linking portion 1613, the ratchet arm 1611 swings around the pivoting lever 1250 which is served as a central axis, allowing the ratchet arm 1611 to swing outward and to separate from the ratchet teeth 1410, at this time the spool 1300 is released and may be rotated in the releasing direction A1; however, since the stopping portion 1612 swings inward to engage with the ratchet teeth 1410 while the ratchet arm 1611 swings outward, the spool 1300 is restricted by the stopping portion 1612 and rotation in the releasing direction A1 is no more allowed, thereby assisting stopping rotation of the spool 1300 before the ratchet arm 1611 returns, and also assisting incrementally releasing the lace. In other words, with the configuration of the stopping portion 1612, as the user operates the swinging arm 1630, the lace will not be fully released, and only one segment of the lace is released. It is noted that, after the user operates the swinging arm 1630, a range that the spool 1300 may be rotated is equal to a length of a ratchet tooth 1410, thereby incrementally releasing the lace. In other embodiments, a range that the spool may be rotated is equal to the lengths of a plurality of ratchet teeth, and the present disclosure is not limited thereto.

In addition, the incremental releasing set 1600 may further include an elastic element 1620, and the elastic element 1620 stores an energy as the ratchet arm 1611 is disengaged from at least one of the ratchet teeth 1410. The elastic element 1620 may have a torsional spring structure, the elastic element 1620 may sleeve on the pivoting lever 1280, and one end of the elastic element 1620 may be driven by the ratchet arm 1611, such that the ratchet arm 1611 may drive the elastic element 1620 to be rotated and to restore the energy, thereby the elastic element 1620 may push the ratchet arm 1611 and the swinging arm 1630 to return after the forced exerted on the swinging arm 1630 is removed.

Figure 7:
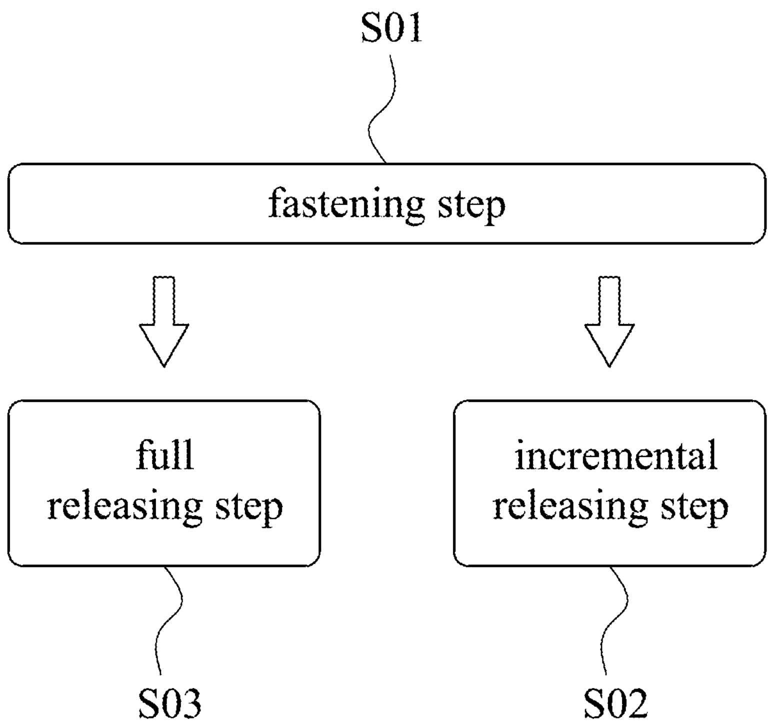
FIG. 7 shows a block flow chart of a lace tightening and releasing method according to a second embodiment of the present disclosure.

Please refer to FIG. 7 with references of FIGS. 1 to 6B, and FIG. 7 shows a block flow chart of a lace tightening and releasing method 2000 according to a second embodiment of the present disclosure. The lace tightening and releasing method 2000 includes a fastening step S01, an incremental releasing step S02 and a full releasing step S03.

In the fastening step S01, a fastening device 1000 disposed at an article is operated, the fastening device 1000 includes a case 1200, a spool 1300, a plurality of ratchet teeth 1410, a ratchet element 1610 and a knob 1700, the spool 1300 is coupled to a lace and located within the case 1200, and as the knob 1700 is rotated in a tightening direction A2, a ratchet arm 1611 of the ratchet element 1610 is disengaged from at least one of the ratchet teeth 1410 to allow the spool 1300 to fasten the lace.

In the incremental releasing step S02, a swinging arm 1630 of the fastening device 1000 is operated, the swinging arm 1630 moves a linking portion 1613 of the ratchet element 1610, and the ratchet arm 1611 is disengaged from at least one of the ratchet teeth 1410 to engage with at least another one of the ratchet teeth 1410, thereby allowing the spool 1300 to rotate in a releasing direction A1 to release one segment of the lace.

In the full releasing step S03, the knob 1700 is operated to allow the ratchet arm 1611 of the fastening device 1000 not to prohibit the spool 1300 from rotating in the releasing direction A1, thereby allowing the lace to be freely released.

Precisely, in the fastening step S01, through operating the knob 1700 to rotate the ratchet gear 1400, the ratchet gear 1400 is rotated to displace the ratchet element 1610, such that the ratchet arm 1611 may separate from the ratchet teeth 1410, thereby fastening the lace. As the knob 1700 stops rotating, the ratchet arm 1611 is engaged with the ratchet teeth 1410 to prohibit the spool 1300 from releasing the lace. In the incremental releasing step S02, as the user operates the swinging arm 1630 one time, the ratchet arm 1611 will disengage from the ratchet teeth 1410, thereby releasing one segment of the lace.

In the full releasing step S03, the knob 1700 may be pulled upward, and the coupling between the ratchet gear 1400 and the spool 1300 may be disengaged, and the spool 1300 will not be affected by the engagement between the ratchet teeth 1410 and the ratchet arm 1611 at this time, and may be rotated freely, thereby fully releasing the lace. In addition to pull up the knob 1700 to release the lace, in other embodiments, the lace may be fully released by rotating the knob, and the present disclosure is not limited thereto.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fastening device, comprising:
- a case, comprising an inner space;
- a spool, disposed in the inner space and configured for a lace to be wound therearound;
- a plurality of ratchet teeth, located in the inner space;
- an incremental releasing set, comprising:
  - a ratchet element, comprising:
    - a ratchet arm, selectively engaged with at least one of the ratchet teeth; and
    - a linking portion; and
  - a swinging arm, abutted against the linking portion; and
- a knob, disposed at the case;
- wherein, the ratchet arm is engaged with at least one of the ratchet teeth to prohibit the spool from rotating in a releasing direction, and as the knob is rotated in a tightening direction, the ratchet arm is disengaged from at least one of the ratchet teeth to allow the spool to tighten the lace; as the swinging arm is operated, the ratchet arm is disengaged from at least one of the ratchet teeth, such that allows the lace to be incrementally released; as the knob is pulled up without operating the swinging arm first, the ratchet arm does not prohibit the spool from rotating in the releasing direction, thereby allowing the lace to be fully released.

2. The fastening device of claim 1, further comprising:
- a ratchet gear, disposed in the inner space and selectively coupled to the spool, the ratchet teeth being located at an outer surface of the ratchet gear.

3. The fastening device of claim 2, wherein the ratchet gear is selectively coupled to the spool, and the knob is operated to allow the ratchet gear to be lifted to release a coupling between the ratchet gear and the spool.

4. The fastening device of claim 3, further comprising a positioning shaft, which is connected to the ratchet gear and protrudes toward the spool, the spool comprising a positioning portion, the positioning shaft being insertably disposed in the positioning portion, the knob being pulled upward to move the ratchet gear and the positioning shaft along an axial direction, thereby releasing the coupling between the ratchet gear and the spool, and the positioning shaft being restricted by the positioning portion.

5. The fastening device of claim 4, wherein the spool comprises:
- an upper ring portion;
- a lower ring portion;
- a winding shaft, connected between the upper ring portion and the lower ring portion, and the winding shaft comprising a central hole; and
- an upper protruding portion, protruding from the upper ring portion toward the knob and comprising an aperture communicated with the central hole;
- wherein, the positioning portion is located in the aperture, and the positioning shaft passes through the aperture into the central hole.

6. The fastening device of claim 1, wherein the ratchet element further comprises a stopping portion, the stopping portion is arranged with the ratchet arm in an interval, and as the ratchet arm is engaged with at least one of the ratchet teeth, the stopping portion is not engaged with any one of the ratchet teeth; as the swinging arm is operated to allow the ratchet arm to disengage from at least one of the ratchet teeth, the stopping portion is engaged with at least another one of the ratchet teeth, thereby stopping the spool.

7. The fastening device of claim 1, wherein a trigger portion of the swinging arm exposes from the case.

8. The fastening device of claim 7, wherein the case comprises:
- an annular wall, comprising an opening;
- a covering portion, radially extending from the annular wall outward; and
- a pivoting base, connected to the covering portion to form a pivoting space;
- wherein, the ratchet element and the swinging arm are pivoted in different positions of the pivoting base and are partially located in the pivoting space, and the ratchet element extends into the inner space to allow the ratchet arm to engage with at least one of the ratchet teeth.

9. The fastening device of claim 1, wherein the incremental releasing set further comprises an elastic element, and the elastic element stores an energy as the ratchet arm is disengaged from at least one of the ratchet teeth.

10. A lace tightening and releasing method, comprising:

a fastening step, a fastening device disposed at an article being operated, the fastening device comprising a case, a spool, a plurality of ratchet teeth, an incremental releasing set and a knob, the spool being coupled to a lace and located within the case, the incremental releasing set comprising a ratchet element and a swinging arm, wherein as the knob is rotated in a tightening direction, a ratchet arm of the ratchet element is disengaged from at least one of the ratchet teeth to allow the spool to fasten the lace;

an incremental releasing step, the swinging arm of the fastening device being operated, the swinging arm moving a linking portion of the ratchet element, the ratchet arm being disengaged from at least one of the ratchet teeth and the incremental releasing set being engaged with at least another one of the ratchet teeth, thereby allowing the spool to rotate in a releasing direction to release one segment of the lace; and a full releasing step, the knob being pulled up without operating the swinging arm first to allow the ratchet arm of the fastening device not to prohibit the spool from rotating in the releasing direction, thereby allowing the lace to be freely released.

* * * * *